US008027358B2

(12) United States Patent
Safranek et al.

(10) Patent No.: US 8,027,358 B2
(45) Date of Patent: Sep. 27, 2011

(54) DYNAMIC LINK WIDTH MODULATION

(75) Inventors: Robert J. Safranek, Portland, OR (US); Selim Bilgin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 11/479,289

(22) Filed: Jun. 29, 2006

(65) Prior Publication Data
US 2008/0002585 A1    Jan. 3, 2008

(51) Int. Cl.
*G06F 13/40*    (2006.01)
(52) U.S. Cl. .................. 370/463; 710/307
(58) Field of Classification Search .......... 370/231–235; 710/305–317
See application file for complete search history.

(56) References Cited

U.S. PATENT DOCUMENTS

| 6,016,311 | A  | * | 1/2000  | Gilbert et al.   | 370/280 |
| 7,065,568 | B2 | * | 6/2006  | Bracewell et al. | 709/223 |
| 7,441,261 | B2 | * | 10/2008 | Slater et al.    | 725/96  |
| 2005/0160212 | A1 | * | 7/2005  | Caruk         | 710/301 |
| 2007/0067548 | A1 | * | 3/2007  | Juenger       | 710/315 |
| 2007/0276981 | A1 | * | 11/2007 | Atherton et al. | 710/307 |

* cited by examiner

*Primary Examiner* — Kwang B Yao
*Assistant Examiner* — Alex Skripnikov
(74) *Attorney, Agent, or Firm* — Blakely, Sokoloff, Taylor & Zafman LLP

(57) ABSTRACT

Techniques for dynamically adjusting point-to-point link width based, at least in part, on link conditions. When operating at full power and at the highest performance level, the full width of a point-to-point link may be utilized to transmit data between the end points. If the link is not fully utilized, a portion (e.g., one half or one quarter) of the link may remain active for communication purposes.

21 Claims, 4 Drawing Sheets

DYNAMIC LINK WIDTH MODULATION

TECHNICAL FIELD

Embodiments of the invention relate to point-to-point link connections within a multi-node system. More specifically, embodiments of the invention relate to techniques for dynamically adjusting link width.

BACKGROUND

In general, the greater the number of circuits operating in a system the greater the power consumption. For a variety of reasons, reduction or minimization of power consumption is frequently a design consideration when implementing an electronic system. Many strategies have been devised to reduce power consumption, most of which involve disabling portions of the system that are not being used. For example, a hard disk may be spun down after a period of inactivity, or a clock signal to a transmission circuit may be disabled after a period of inactivity. While power utilization has improved, further improvements may be made.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques for dynamically adjusting point-to-point link width based, at least in part, on link conditions. In one embodiment, when operating at full power and at the highest performance level, the full width of a point-to-point link may be utilized to transmit data between the end points. If the link is not fully utilized, a portion of the link may remain active for communication purposes. For example, one half or one quarter of the data lines of the link may remain active while the remaining data lines may be inactivated, which may conserve power. One or more lines carrying control signals, for example, a clock line may be inactivated as well if not necessary for use of the data lines that remain active.

Figure 1:
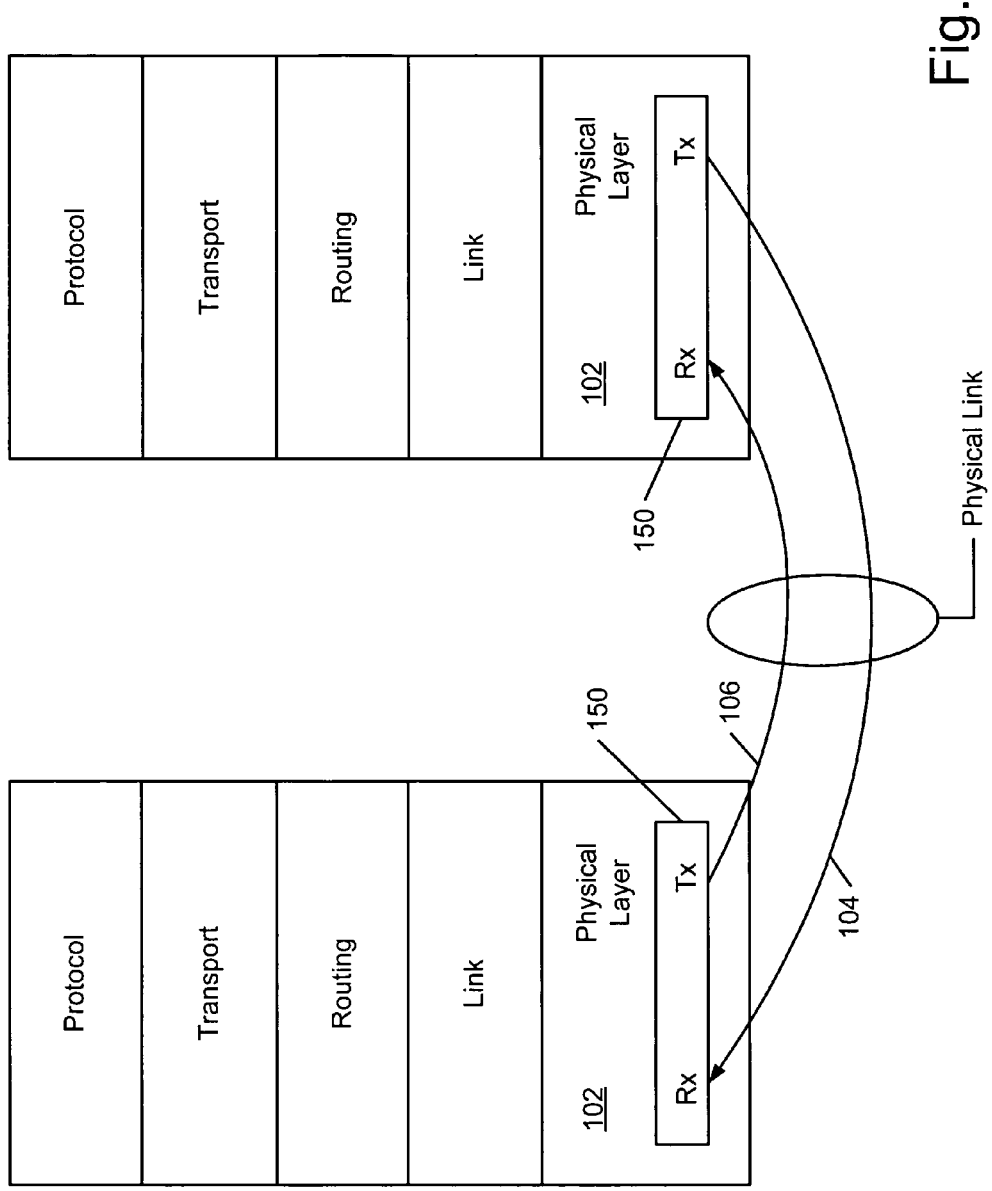
FIG. 1 is a block diagram of one embodiment of an apparatus for a physical interconnect.

FIG. 1 is a block diagram of one embodiment of an apparatus for a physical interconnect. In one aspect, the apparatus depicts a physical layer for a cache-coherent, link-based interconnect scheme for a processor, chipset, and/or IO bridge components. For example, the physical interconnect may be performed by each physical layer of an integrated device.

Specifically, the physical layer 102 may provide communication between two ports over a physical interconnect comprising two uni-directional links. Specifically, one uni-directional link 104 from a first transmit port 150 of a first integrated device to a first receiver port 150 of a second integrated device. Likewise, a second uni-directional link 106 from a first transmit port 150 of the second integrated device to a first receiver port 150 of the first integrated device. However, the claimed subject matter is not limited to two uni-directional links.

Figure 2:
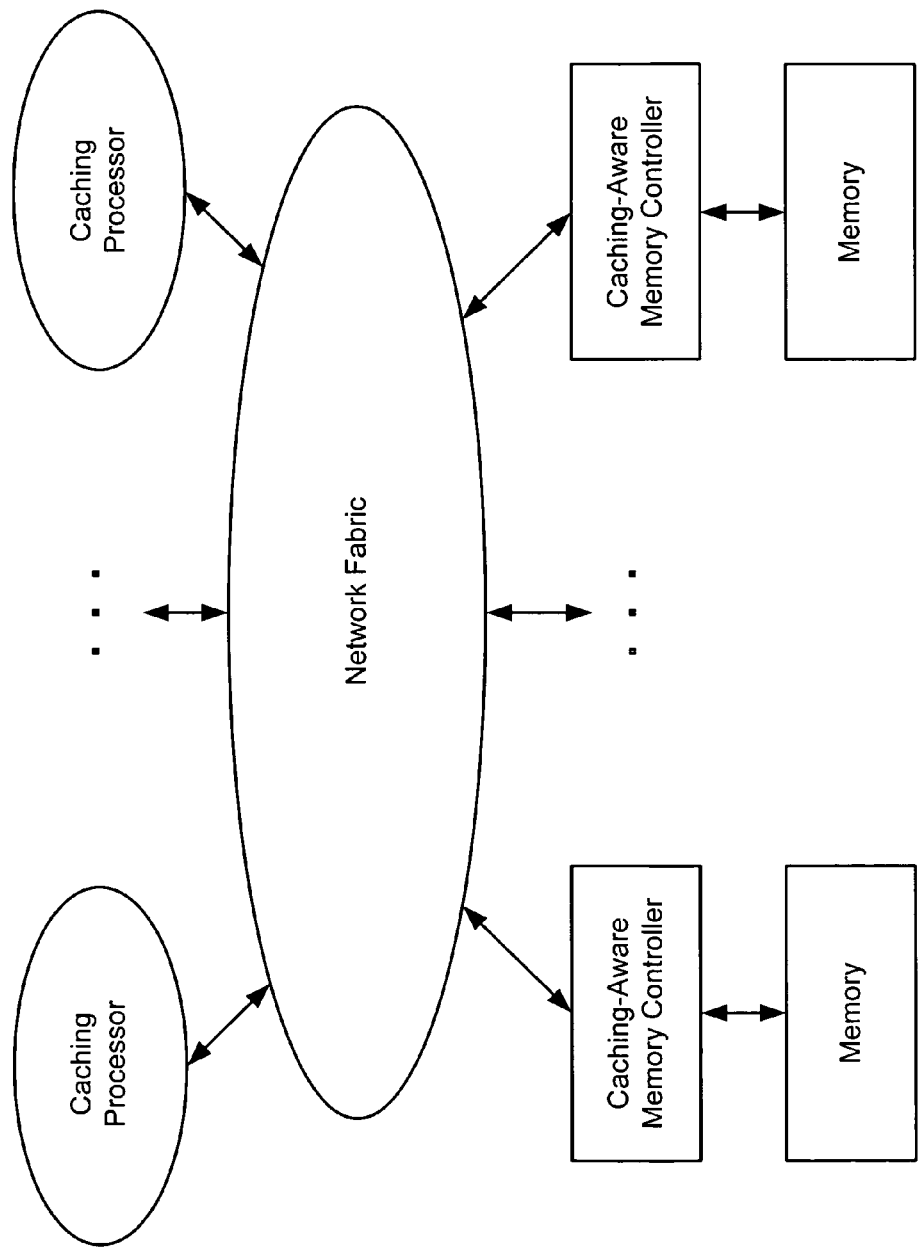
FIG. 2 is a conceptual illustration of one embodiment of a system that may utilize point-to-point interconnects.

FIG. 2 is a conceptual illustration of one embodiment of a system that may utilize point-to-point interconnects. Each point-to-point link illustrated in FIG. 2 may be implemented as described in FIG. 1. In one embodiment, the system of FIG. 2 may utilize a point-to-point architecture that supports a layered protocol scheme. In one embodiment, the system may include a plurality of caching agents, home agents, input/output (I/O) agents coupled to a network fabric. For example, the network fabric may adhere to a layered protocol scheme and comprised of: a physical layer, a link layer, a routing layer, a transport layer and a protocol layer (as depicted in connection with FIG. 1).

FIG. 2 is a high level, simplified abstraction of a protocol architecture that may utilize one or more point-to-point links. The fabric may facilitate transporting messages between system agents (e.g., caching processor or caching aware memory controller) to other system agents utilizing point-to-point links. Each caching-aware memory controller may be coupled with memory that may include, for example, dynamic random access memory (DRAM), flash memory, or any other type of memory known in the art.

In the example that follows, five uni-directional link states may be supported; however, any number of link states supporting any number of link widths may be supported in a system. In one embodiment, each direction of each point-to-point link may have independently controlled operational states. State "L0" may refer to a full active link width (all data lines are utilized); state "L0S" may refer to a state in which link drivers are disabled (i.e., no data is transmitted over the data lines), but the clock signal to the link drivers is not disabled; state "L0.5" may refer to a state in which half of the link width (e.g., half of the data lines) is utilized and the other half is disabled; state "L1" may refer to a state in which link drivers for both directions of the link as well as the link clock signal are disabled; and state "L2" may refer to a state in which the link is completely powered off.

Reference to link width generally refers to the data lines. That is, full link width refers to all data lines being utilized to transmit data, half link width refers to half of the data lines being utilized to transmit data, etc. The number of control lines may not be proportional to the link width characterization. That is, half link width does not necessarily mean that half of the control lines are utilized to transmit data over half of the data lines.

Figure 3:
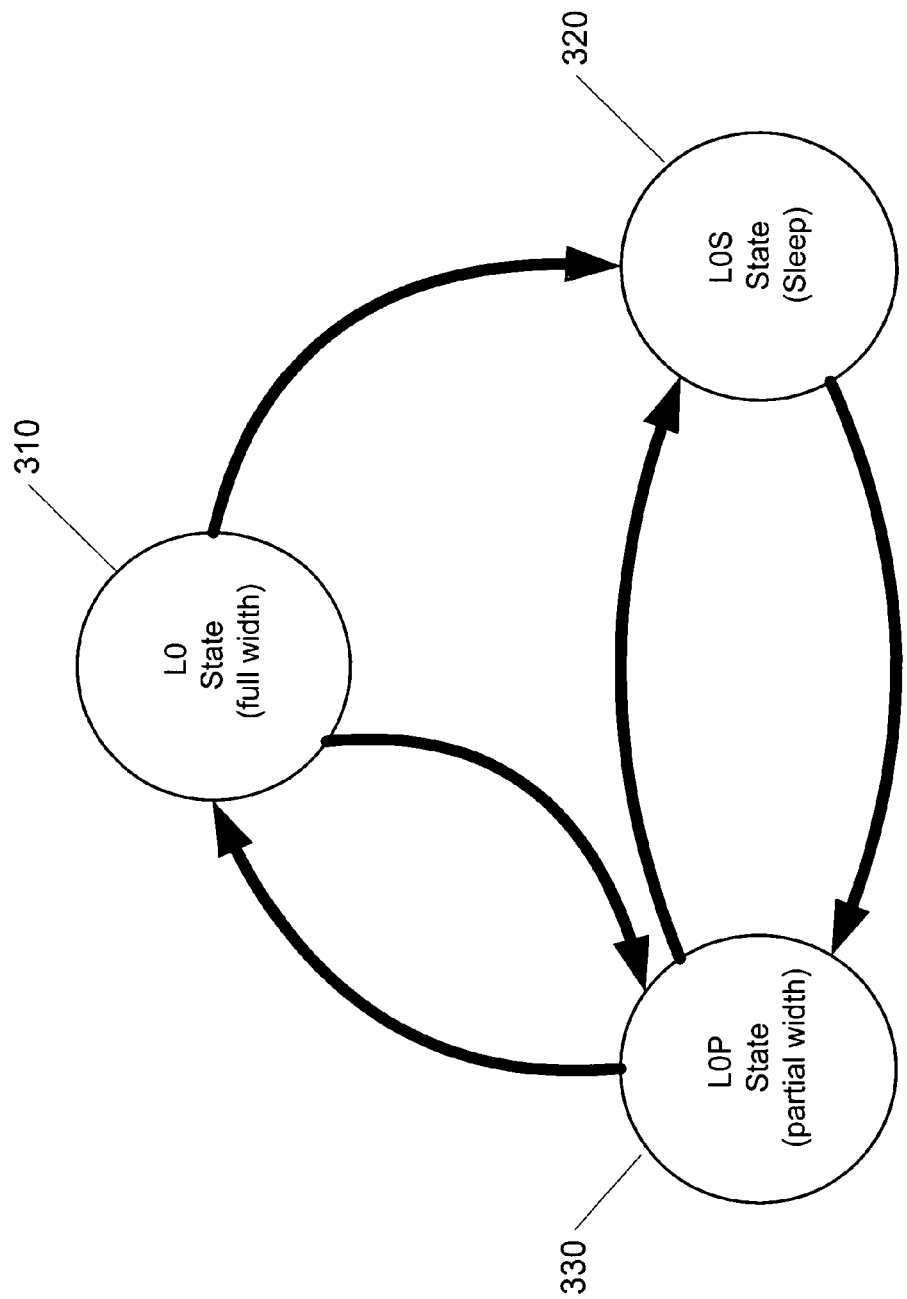
FIG. 3 is a state diagram of one embodiment of a technique for dynamic link width modification.

FIG. 3 is a state diagram of one embodiment of a technique for dynamic link width modification. The state diagram of FIG. 3 corresponds to an architecture that supports a full link width state (L0), a sleep state (L0S) and a partial link width state (L0P) for each uni-directional link. More complex architectures, for example, supporting a full link width state (L0), a sleep state (L0S), a half link width state (L0.5), and a quarter link width state (L0.25) for each uni-directional link. Other states and combinations may also be supported.

In state 310 (L0) uni-directional link bandwidth utilization may be monitored and if the bandwidth utilization is below a low water mark or bandwidth utilization floor for a specified time interval, the uni-directional link may transition to state 330 (L0P) in which a portion (e.g., half) of the link is utilized. In one embodiment if, in state 310, the bandwidth utilization is zero, the link may transition to state 320 (L0S) in which the uni-directional link is placed in a sleep state. The low water mark or bandwidth utilization floor may refer to a threshold value corresponding to a bandwidth utilization level (e.g., 40%, 20%) at which the uni-directional link may be considered underutilized.

In state 330 (L0P) uni-directional link bandwidth utilization may be monitored and if the bandwidth utilization is above a high water mark or bandwidth utilization ceiling for a specified time interval, the link may transition to state 310 (L0) in which the full width of the link is utilized. The high water mark or bandwidth utilization ceiling may refer to a threshold value corresponding to a bandwidth utilization level (e.g., 80%, 90%) at which the uni-directional link may be considered fully utilized or close enough to fully utilized that a greater data width should be provided in order to avoid becoming a bottleneck.

In one embodiment if, in state 330, the bandwidth utilization is zero, the unidirectional link may transition to state 320 (L0S) in which the uni-directional link is placed in a sleep state. In state 320, the unidirectional link may transition to state 330 (or state 310) in order to initiate communications over the unidirectional link.

Figure 4:
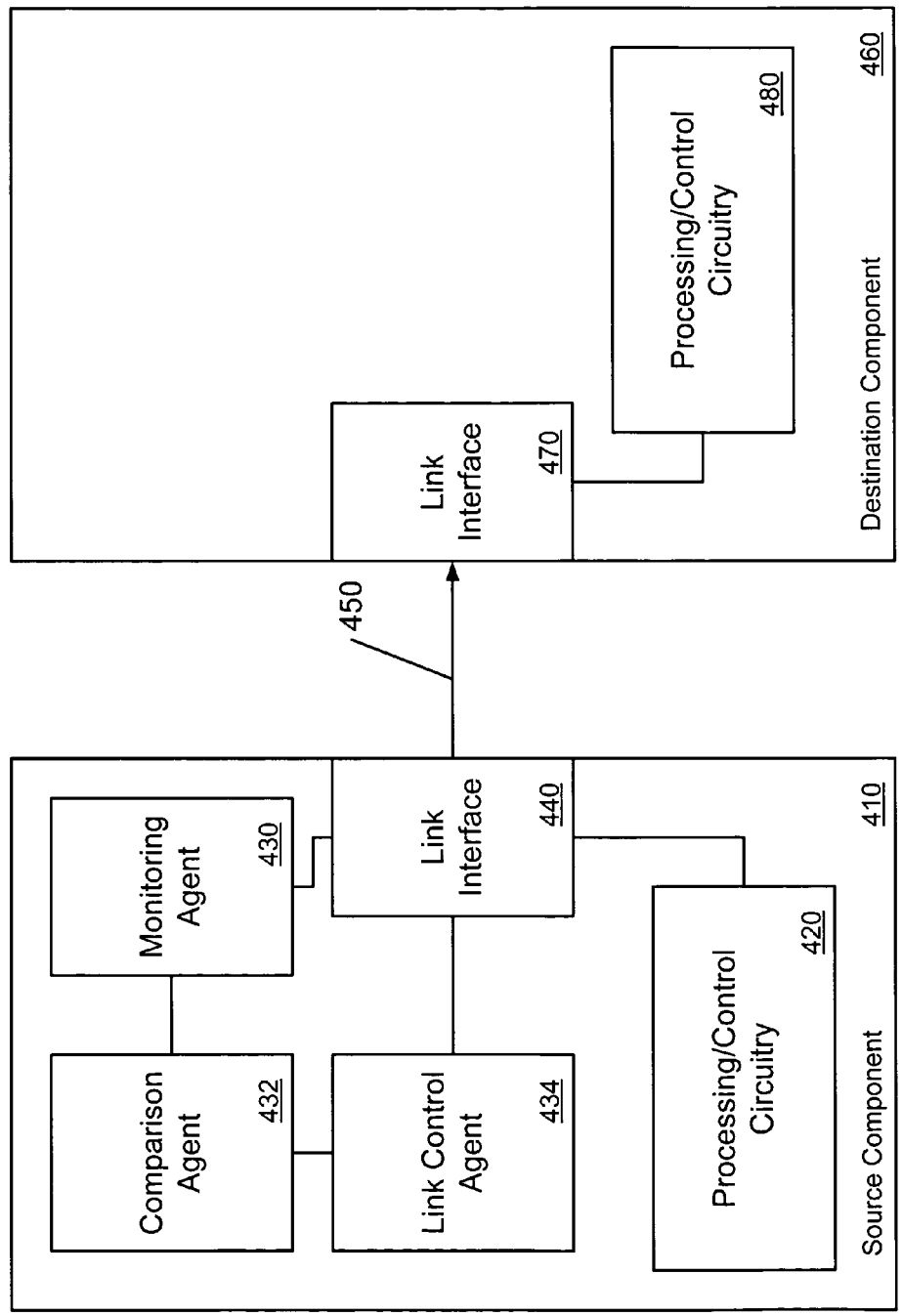
FIG. 4 is a block diagram of one embodiment of a source component coupled to a link to transmit data to a destination component.

FIG. 4 is a block diagram of one embodiment of a source component coupled to a link to transmit data to a destination component. The example of Figure illustrates only a single uni-directional link to transmit data from the source component to the destination component. The destination component may have a corresponding architecture to transmit data to the source component in order to provide bi-directional communications between the two components.

In one embodiment, the components illustrated in FIG. 4 are components within a larger electronic system having many additional components not illustrated in FIG. 4. The components of FIG. 4 may be, for example, processors, memory controllers, bridges, chip sets, node controllers, etc. The components of FIG. 4 are intended to represent any components within an electronic system that may communicate via point-to-point links.

Source component 410 may be any type of component within an electronic system, for example, a processor. Source component 410 may include processing/control circuitry 420 that may provide the desired functionality of source component 410. For example, if source component 410 is a processor, processing/control circuitry 420 may be a processor core.

Source component 410 may include link interface 440, which may be any type of interface between the circuitry of source component 410 and physical link 450. Similarly, destination component 460 may include a counterpart link interface 470. Link interface 470 may be coupled to processing/control circuitry 480 in destination component 460. If, for example, destination component 460 is a memory controller, processing/control circuitry 480 may be the control circuitry of the memory controller to cause memory operations to and from source component 410 to be performed utilizing a memory device (not illustrated in FIG. 4), which may be, for example, a dynamic random access memory, a static random access memory, etc.

In one embodiment, monitoring agent 430 may be communicatively coupled with link interface 440 to monitor traffic on link 450. Monitoring agent 430 may be implemented as hardware, software, firmware or any combination thereof. Monitoring agent 430 may monitor traffic on link 450 using any type of technique. For example, monitoring agent 430 may be configured to count the number of bytes of data (or any other block of data) over a selected period of time.

In one embodiment, an output from monitoring agent 430 may include a value corresponding to the amount of data transmitted over the selected period of time. This type of monitoring may be performed continuously for multiple periods of time. The monitoring may also be performed a predetermined intervals.

Comparison agent 432 may be coupled with monitoring agent 430 to compare values output by monitoring agent 430 to one or more threshold values. Comparison agent 432 may be implemented as hardware, software, firmware or any combination thereof. In one embodiment, the one or more threshold values may be dynamically modified using any technique known in the art.

In one embodiment, comparison agent 432 may have a threshold value for full link width (e.g., L0 state) operation. This threshold value may be referred to as the "L0 low water mark" and may indicate a bandwidth utilization level at which the link width should be reduced. Comparison agent 432 may also have at least one threshold value for reduced link width (e.g., L0P state) operation. This threshold value may be referred to as the "L0P high water mark" and may indicate a bandwidth utilization level at which the link width should be increased. Comparison agent 432 may further have a threshold value corresponding to transition to the sleep (e.g., L0S) state. This threshold value may be referred to as the "L0S low water mark" and may indicate a bandwidth utilization level at which the link should be placed in the sleep state. In one embodiment, the L0P low water mark value is zero.

The example described above with respect to FIG. 3 includes full width operation (L0 state), half width operation (L0P state) and a sleep state (L0S state). In an embodiment with only full width operation and half (or quarter) width operation, the L0 low water mark and L0P high water mark threshold values may be sufficient. However, in a more complex embodiment having intermediate states, the intermediate states may have both high water marks and low water marks.

In the following example, a full link width state (L0), a sleep state (L0S), a half link width state (L0.5), and a quarter link width state (L0.25) may be supported. In such an embodiment, comparison agent 432 may have a threshold value for full link width (e.g., L0 state) operation. This threshold value may be referred to as the "L0 low water mark" and may indicate a bandwidth utilization level at which the link width should be reduced. Comparison agent 432 may have two threshold values for half link width (e.g., L0.5 state) operation. These threshold values may be referred to as the "L0.5 high water mark" that may indicate the bandwidth utilization level at which the link width should be increased and the "L0.5 low water mark) that may indicate the bandwidth utilization level at which the link width should be decreased.

Comparison agent 432 may also have two threshold values for quarter link width (e.g., L0.25 state) operation. These threshold values may be referred to as the "L0.25 high water mark" that may indicate the bandwidth utilization level at which the link width should be increased and the "L0.25 low water mark) that may indicate the bandwidth utilization level at which the link width should be placed in the sleep (e.g. L0S) state.

In one embodiment, comparison agent 432 may generate one or more output signal corresponding to one or more comparisons of the output signal from monitoring agent 430 and the threshold values. Link control agent 434 may be communicatively coupled with comparison agent to receive the results of the comparison(s). In response to the comparison(s), link control agent 430 may cause utilization of link 450 to correspond to the link states described herein.

Link 450 may include any number of data lines and any number of control lines. For example, if link 450 includes 20 data lines, all 20 data lines may be enabled and used when link 450 is operating at full width. When link 450 operates at half width, 10 data lines may be enabled and used and the other 10 data lines may be disabled. By disabling data lines, power may be removed from the circuits that drive or otherwise control the lines. By removing power to a portion of the data lines, overall power consumption may be reduced. If link 450 operates at quarter width, 5 lines may be enabled and used and the other 15 lines may be disabled.

In some embodiments, one or more control lines may be disabled when link 450 operates at less than full width. However, the number of control lines that may be disabled may not be proportionate to the number of data lines that are disabled.

In one embodiment, when link 450 operates at less than full width, data may be transmitted in smaller blocks than when link 450 operates at full width. For example, assuming that link 450 has 20 data lines, when operating at full width data may be provided (e.g., read from a buffer) in 20-bit increments to be transmitted over link 450. When link 450 operates at half width utilizing 10 data lines, data may be provided in 10-bit increments to be transmitted over link 450. That is, the bandwidth provided by link 450 may be reduced, which may result in a corresponding reduction in power consumption by link 450. If the reduced bandwidth does not result in an unsatisfactory reduction in system performance, selective operation of link 450 at less than full width may result in improved operation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
monitoring bandwidth utilization of a point-to-point link comprising a pair of unidirectional links between a first electronic component and a second electronic component for a period of time, wherein a first link width is utilized for data communication during the period of time;
comparing the bandwidth utilization to one or more threshold values; and
selectively modifying the monitored link width operation to a second link width based, at least in part, on results of the comparison, wherein link width operation is selected from one of five supported operating states comprising a first state corresponding to a full active link width where all data lines are utilized, a second state in which link drivers are disabled and no data is transmitted over data lines, but a clock signal to the link drivers is not disabled, a third state in which half of the data lines are utilized and the other half is disabled, a fourth state in which link drivers for both directions of the point-to-point link as well as the link clock signal are disabled, and a fifth state in which the point-to-point link is completely powered off.

2. The method of claim 1 wherein selectively modifying the point-to-point link width operation based, at least in part, on the comparison comprises disabling a portion of the point-to-point link if the bandwidth utilization is less than a first threshold value of the one or more threshold values.

3. The method of claim 2 wherein the portion of the point-to-point link comprises one half of a plurality of data lines corresponding to the point-to-point link.

4. The method of claim 2 wherein the portion of the point-to-point link comprises three quarters of a plurality of data lines corresponding to the point-to-point link.

5. The method of claim 1 wherein selectively modifying the point-to-point link width operation based, at least in part, on the comparison comprises enabling a previously disabled portion of the point-to-point link if the bandwidth utilization is greater than a second threshold value from the one or more threshold values.

6. The method of claim 1 wherein the period of time is dynamically modifiable.

7. The method of claim 1 wherein one or more threshold values are dynamically modifiable.

8. An apparatus comprising:
a physical point-to-point link comprising a pair of unidirectional links within an electronic system having a plurality of data lines and a plurality of control lines;
a first component within the electronic system coupled with a first end of the link to receive data transmitted over a first unidirectional link of the point-to-point link; and
a second component within the electronic system coupled with a second end of the link to transmit data to the first component over the first unidirectional link, the first component having a monitoring agent to monitor bandwidth utilization of the first unidirectional link during a period of time, a comparison agent to compare the bandwidth utilization to one or more threshold values, and a link control agent to selectively modify link width operation for the first unidirectional link based, at least in part, on results of the comparison, wherein link width operation is selected from one of five supported operating states comprising a first state corresponding to a full active link width where all data lines are utilized, a second state in which link drivers are disabled and no data is transmitted over the data lines, but a clock signal to the link drivers is not disabled, a third state in which half of the data lines are utilized and the other half is disabled, a fourth state in which point-to-point link drivers for both directions of the point-to-point link as well as a link clock signal are disabled, and a fifth state in which the point-to-point link is completely powered off.

9. The apparatus of claim 8 wherein the selective modification of the point-to-point link width operation based, at least in part, on the comparison comprises disabling a portion of the point-to-point link if the bandwidth utilization is less than a first threshold value of the one or more threshold values.

10. The apparatus of claim 9 wherein the portion of the point-to-point link comprises one half of a plurality of data lines corresponding to the point-to-point link.

11. The apparatus of claim 9 wherein the portion of the point-to-point link comprises three quarters of a plurality of data lines corresponding to the point-to-point link.

12. The apparatus of claim 8 wherein the selective modification of the point-to-point link width operation based, at least in part, on the comparison comprises enabling a previously disabled portion of the point-to-point link if the bandwidth utilization is greater than a second threshold value from the one or more threshold values.

13. The apparatus of claim 8 wherein the period of time is dynamically modifiable.

14. The apparatus of claim 8 wherein one or more threshold values are dynamically modifiable.

15. A system comprising:
a physical point-to-point link comprising a pair of unidirectional links within an electronic system having a plurality of data lines and a plurality of control lines;
a dynamic random access memory;
a first component within the electronic system coupled with a first end of the link to receive data transmitted over a first unidirectional link of the point-to-point link; and
a second component within the electronic system coupled with a second end of the link to transmit data to the first component over the first unidirectional link, the first component having a monitoring agent to monitor bandwidth utilization of the first unidirectional link during a period of time, a comparison agent to compare the bandwidth utilization to one or more threshold values, and a link control agent to selectively modify link width operation for the first unidirectional link based, at least in part, on results of the comparison, wherein link width operation is selected from one of at least five supported operating states comprising a first state corresponding to a full active link width where all data lines are utilized, a second state in which link drivers are disabled and no data is transmitted over the data lines, but a clock signal to the link drivers is not disabled, a third state in which half of the data lines are utilized and the other half is disabled, a fourth state in which point-to-point link drivers for both directions of the point-to-point link as well as a link clock signal are disabled, and a fifth state in which the point-to-point link is completely powered off.

16. The system of claim 15 wherein the selective modification of the point-to-point link width operation based, at least in part, on the comparison comprises disabling a portion of the point-to-point link if the bandwidth utilization is less than a first threshold value of the one or more threshold values.

17. The system of claim 16 wherein the portion of the point-to-point link comprises one half of a plurality of data lines corresponding to the point-to-point link.

18. The system of claim 16 wherein the portion of the point-to-point link comprises three quarters of a plurality of data lines corresponding to the point-to-point link.

19. The system of claim 15 wherein the selective modification of the point-to-point link width operation based, at least in part, on the comparison comprises enabling a previously disabled portion of the point-to-point link if the bandwidth utilization is greater than a second threshold value from the one or more threshold values.

20. The system of claim 15 wherein the period of time is dynamically modifiable.

21. The system of claim 15 wherein one or more threshold values are dynamically modifiable.

* * * * *